United States Patent [19]

Sato et al.

[11] Patent Number: 5,004,656
[45] Date of Patent: Apr. 2, 1991

[54] FLAT TYPE SEALED BATTERY WITH HERMETIC SEALING STRUCTURE

[75] Inventors: Kiyoshi Sato; Hirokazu Yoshikawa, both of Ibaraki; Shigeru Ikenari, Suita; Kenichi Yokoyama, Takatsuki, all of Japan

[73] Assignee: Hitachi Maxell, Ltd., Osaka, Japan

[21] Appl. No.: 400,165

[22] Filed: Aug. 28, 1989

[30] Foreign Application Priority Data

| Aug. 29, 1988 | [JP] | Japan | 63-214575 |
| Aug. 29, 1988 | [JP] | Japan | 63-214576 |
| Aug. 29, 1988 | [JP] | Japan | 63-214580 |
| Aug. 29, 1988 | [JP] | Japan | 63-214581 |

[51] Int. Cl.⁵ .................................. H01M 2/08
[52] U.S. Cl. ........................... 429/162; 429/185
[58] Field of Search ............ 429/162, 163, 172, 174, 429/185

[56] References Cited

U.S. PATENT DOCUMENTS

| 2,606,941 | 8/1952 | Ruben | 429/174 |
| 3,556,848 | 1/1971 | Ruetschi | 429/174 |
| 3,664,878 | 5/1972 | Amthor | 429/54 |
| 3,871,921 | 3/1975 | Beatty et al. | 429/162 |
| 4,122,243 | 10/1978 | Tsuchida et al. | 429/174 |
| 4,215,187 | 7/1980 | Gnida et al. | 429/161 |
| 4,279,975 | 7/1981 | Bowsky | |
| 4,398,346 | 8/1983 | Underhill et al. | |
| 4,544,078 | 10/1985 | Arenas et al. | 220/256 |
| 4,592,970 | 6/1986 | Zupancic | 429/82 |
| 4,609,598 | 9/1986 | Tucholski et al. | 429/185 |

FOREIGN PATENT DOCUMENTS

| 616025 | 2/1980 | Switzerland . |
| 2093629 | 9/1982 | United Kingdom . |

Primary Examiner—Anthony Skapars
Attorney, Agent, or Firm—Birch, Stewart, Kolasch & Birch

[57] ABSTRACT

A flat disc type sealed battery comprises a battery vessel having a bottom wall with an electrolyte charging opening formed in the central portion thereof, and a battery lid member for covering the upper opening of the battery vessel. Power generating components are enclosed by sealing the battery vessel battery lid member, and a first sealing member is provided for sealing the electrolyte charging opening after the electrolyte is charged into the battery vessel, and a second sealing member is provided for covering the aperture in the side of the lower edge portion of the electrolyte charging opening. The outer peripheral portion of the second sealing member is welded to the bottom wall of the battery vessel to perfectly seal the battery vessel.

2 Claims, 12 Drawing Sheets

FLAT TYPE SEALED BATTERY WITH HERMETIC SEALING STRUCTURE

BACKGROUND OF THE INVENTION

1. Field of the Invention

The present invention relates to a flat sealed type battery with an electrolyte charging aperture formed in the central portion of a bottom wall of a battery vessel.

2. Description of the Prior Art

In recent years, in various fields there have been used lithium batteries having little self-discharge and a long life with the progress of electronic apparatuses. Therefore, there has been developed a lithium-oxyhalide battery. such as a lithium thionyl chloride battery, adopting a so called hermetic sealing structure of a cylindrical type with a battery lid made of metal-glass-metal, which is used as a power source for memory back up of C-MOS RAM. Since such a battery has a structure with a high sealing function and has a long life of more than ten years, the demand for such a lithium oxyhalide battery is rapidly increased.

However, in the market, not only are the above mentioned cylindrical type batteries for memory back-up in demand but also small, and thin type batteries for memory back-up are also required because of demand for reduction of consumption of current of IC and for miniaturization in size and reducing the weight of the apparatuses.

Although there has been commercialized a flat type lithium battery, such as a lithium manganese dioxide battery or lithium graphite fluoride battery in the prior art, the sealing structure of such a battery is made in so called a crimp seal method that there is provided a gasket made of a plastic resin material between an opening end portion of a positive electrode can and the outer peripheral portion of a negative electrode can so that the opening end portion of the positive electrode can is fastened inwardly so as to seal the battery vessel (see the Japanese Patent Laid Open Sho 56-167274 for example). Therefore, there is a limitation period in which the battery is available with a sealing ability, and the battery is available for, at most, 5 to 7 years and it can not possibly be used for more than ten years. Accordingly, though a flat type sealed battery with a high sealing function, employing a hermetic seal, is in demanded by users, the demand of the users has not yet been realized due to the difficulty of the sealing techniques after charging the electrolyte.

That is to say, in the cylindrical type battery, the size and volume of the battery is large and the total height of the battery is at least more than 25 mm and since the sealing process is performed on the top end portion of a pipe used as an electrolyte charging entrance after the charge of the electrolyte (see the Japanese Patent Laid Open Sho 62-160660 for example), therefore, there can be formed a distance of at least more than 5 mm between the surface of the electrolyte and the sealed portion in the battery vessel, so that the heat applied at the time of the welding for sealing has a little affect on the electrolyte. However, in the flat type battery with a total height of the battery of at most 10 mm, since the distance between the surface of the electrolyte and the welded portion for sealing is merely about 1 to 2 mm, the electrolyte is vaporized due to the heat applied at the time of welding for sealing so that the vaporized gas is spurted out from the inside of the battery, which flies to the welded portion for sealing, so that there occurs a pin hole at the welded portion, resulting in that a perfectly sealed structure can not be realized.

Figure 1:
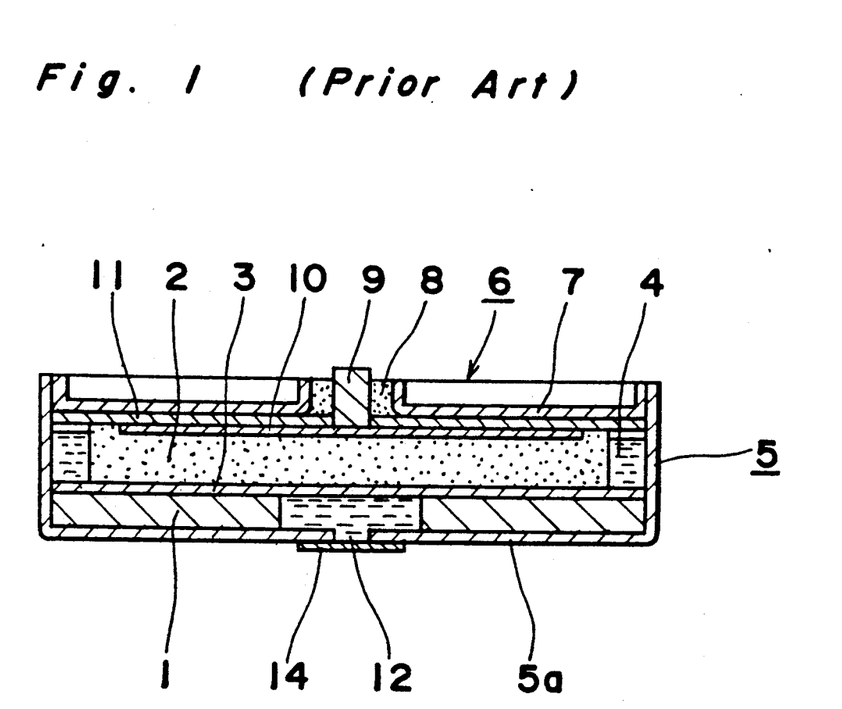
FIG. 1 is a sectional view showing a conventional flat type sealed battery.

In the conventional flat type battery, if an electrolyte charging entrance is formed at the edge portion of the battery lid, the welding portion thereof is so near to a glass layer that the glass layer can easily be broken due to the heat of the welding, and therefore, as shown in FIG. 1, it has been attempted to form a hole at the central portion of the bottom wall 5a of the battery vessel 5 to use as the electrolyte charging entrance 12. After the electrolyte is charged into the battery vessel through the electrolyte charging entrance 12, the state of the battery is reversed so as to be turned upside down to the state of the battery shown in FIG. 1 at least from the time of charging the electrolyte and covering the electrolyte charging entrance 12 with a sealing plate 14 and the outer peripheral portion of the sealing plate 14 is welded with the bottom wall 5a of the battery vessel 5. However, as described above, since the distance between the welded portion for sealing and the surface of the electrolyte is so short the electrolyte is vaporized due to the heat of the welding and the vaporized gas escapes out of the welded portion, resulting in that the welding is prevented or there occurs a pin hole at the welded portion so as to cause damage to the sealing structure.

SUMMARY OF THE INVENTION

The present invention has been made in order to solve the problem mentioned above and has as its object to provide a flat type sealed battery reliably sealed which can be used for more than ten years, solving the difficulties of the sealing technique when producing a flat type sealed battery adopting a hermetic seal as described above, thereby obtaining a good welding of a battery vessel.

In order to accomplish the object mentioned above, a flat disc type sealed battery comprises a battery vessel having a bottom wall with an electrolyte charging opening formed in the central portion thereof, a battery lid member for covering the upper opening of the battery vessel, power generating components enclosed by sealing the battery vessel and battery lid member, a first sealing member for sealing the electrolyte charging opening after the electrolyte is charged into the battery vessel, and a second sealing member for covering an aperture in the side of the lower edge portion of the electrolyte charging opening, the outer peripheral portion of the second sealing member being welded to the bottom wall of the battery vessel.

The features of the present invention which are believed to be novel are set forth with particularity in the appended claims. The present invention, both as to its organization and manner of operation, together with further objects and advantages thereof, may best be understood by reference to the following description, taken in conjunction with the accompanying drawings.

DETAILED DESCRIPTION OF THE PREFERRED EMBODIMENTS

The present invention has been made in order to accomplish the object mentioned above and the embodiments of the present invention are explained hereinafter with reference to FIGS. 2 to 8 and FIGS. 9 to 16.

Before the description proceeds, it is noted that since the basic structure of the battery is similar to that of the conventional battery explained with reference to FIG. 1, like parts are designated by the same reference numerals and the explanation of details thereof is herein omitted for brevity.

In the central portion of a bottom wall 5a of a battery vessel 5 is formed an electrolyte charging opening 12 of a cylindrical shape or taper cylindrical shape in which a first sealing member 13 of generally a spherical shape is provided for sealing the battery vessel after charging the electrolyte in the battery vessel and a second sealing member 14 as a disc plate is provided for sealing the lower entrance aperture of the electrolyte charging opening 12 and the outer peripheral portion of the upper surface of the second sealing member 14 is welded to the bottom wall 5a of the battery vessel 5 so as to cover the lower aperture of the opening 12, thereby sealing the battery vessel. Further described in detail, in the embodiments of the present invention, since the first sealing member 13 is inserted in the electrolyte charging opening 12 by press fitting to the inner surface of the surrounding wall of the cylindrical or taper cylindrical shaped opening 12, the circumference wall of the electrolyte charging opening 12 is expanded by the press fitting insertion of the first sealing member 13 so that the reactive stress for recovering the peripheral wall of the electrolyte charging opening 12 is applied to the contacted portion of the first sealing member 13, thereby enhancing of the sealing function between the peripheral wall of the electrolyte charging opening 12 and the first sealing member 13.

Therefore, when the outer peripheral portion of the second sealing member 14 is welded to the bottom wall 5a of the battery vessel 5 so as to seal the battery vessel, the evaporated gas of the electrolyte does not escape through the welded portion so that the welding of the second sealing member 14 can be performed without pinholes forming in the welded portion so that the electrolyte charging opening 12 is perfectly sealed, thereby obtaining a battery with a reliably and improved sealed structure.

Although, in the embodiments mentioned below, the explanation is made about a flat type sealed battery of a lithium thionyl chloride group, the present invention is not limited to this.

PREFERRED EMBODIMENTS

EXAMPLE 1

Figure 2:
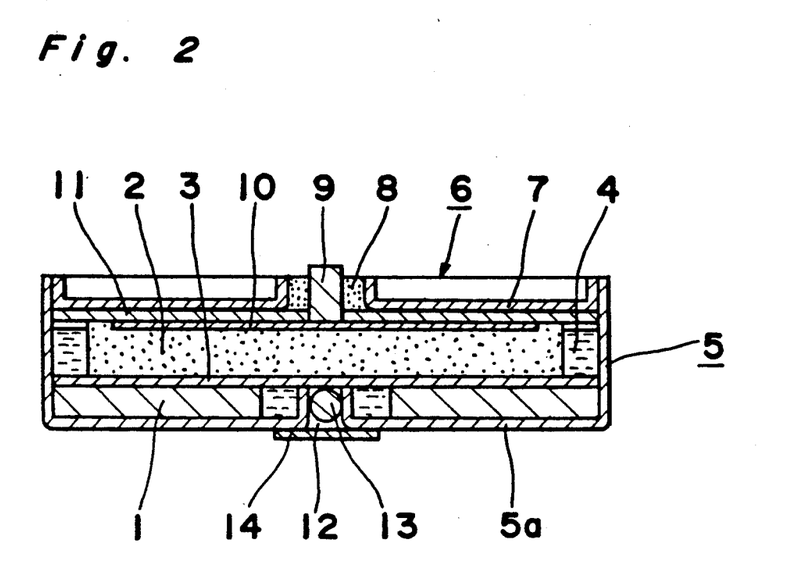
FIG. 2 is a sectional view showing a first embodiment of a flat type sealed battery according to the present invention.
Figure 3A:
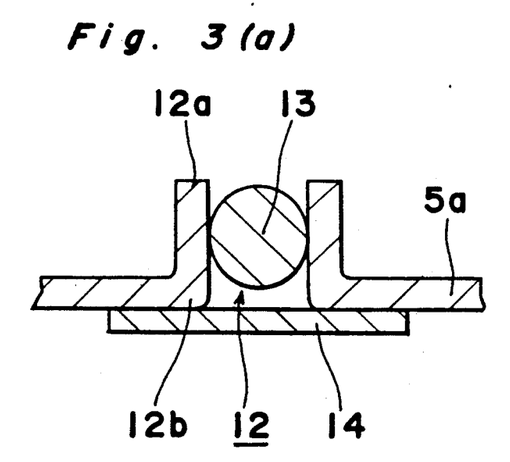
FIG. 3(a) is an enlarged sectional view showing an essential part of the battery shown in FIG. 2.
Figure 3B:
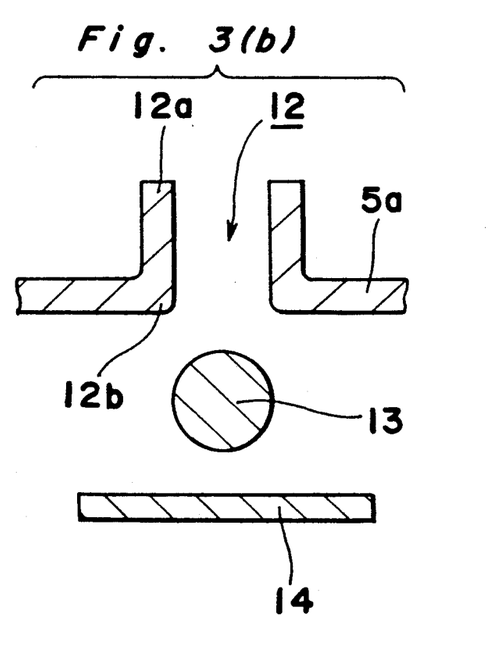
FIG. 3(b) is an exploded view of FIG. 3(a)

FIGS. 2 and 3 show a first preferred embodiment of a flat disc type sealed battery according to the present invention, wherein in the sectional views the outline of the back portion is omitted. In the example 1, the first sealing member 13 of generally a spherical shape and the second sealing member 14 of a disc plate are respectively provided separately, which is similar to those in the examples 2 to 8.

Referring to the schematic of the flat disc type sealed battery, a negative electrode, is made of lithium, a positive electrode 2 is made of an amorphous carbon porous mold, and a separator member 3 is made of glass fiber non-woven fabric for separating the negative electrode 1 from the positive electrode 2. An electrolyte 4 is provided is a battery vessel 5 made of stainless steel. A battery lid member 6 comprises a ring shaped body member 7 made cf stainless steel, a ring shaped insulating layer 8 made of glass and a positive electrode terminal member 9 made of stainless steel, wherein the outer peripheral portion of the body member 7 is welded to the upper end portion of the circumferential wall of the top opening of the battery vessel 5. A charge collecting member 10 made of stainless steel mesh is spot-welded to the bottom surface of the positive electrode terminal 9. An insulating member 11 made of a glass fiber, non-woven fabric insulates the positive electrode 2 and the positive electrode charge collector 10 from the body member 7 of the battery lid 6. An electrolyte charging opening 12 of a cylindrical shape, with its top end portion 12a projected to the inside of the battery, is formed in the central portion of the bottom wall 5a of the battery vessel 5 (see FIG. 3). A first sealing member B of generally a spherical form is inserted by press fitting into the electrolyte charging opening 12 after the electrolyte 4 is charged in the battery vessel through the electrolyte charging opening 12. A second sealing member 14 of a disc plate is made of stainless steel of which the central portion covers the entrance aperture at the side of the lower edge 12b of the electrolyte charging opening 12 and the outer peripheral portion of the second sealing member 14 is welded to the bottom wall 5a of the battery vessel 5 as shown in FIG. 3(a). The battery is a small, thin flat disc type with an outer diameter of 33 mm and total height of 6.5 mm.

The negative electrode 1 is made in a manner that a lithium sheet, molded in a ring disc shape, is pressed onto the inner surface of the bottom wall 5a of the battery vessel 5 and is made of only lithium material, which is a negative electrode active material. The positive electrode 2 is made of a porous mold substantially including amorphous carbon consisting of mainly acetylene black and additive graphite and polytetrafluoroethylene added, which is so called an amorphous carbon porous mold. The electrolyte 4 is a thionyl chloride solution consisting of thionyl chloride having aluminum lithium tetrachloride of 1 mol/lit. solved, wherein the thionyl chloride is the solvent of the electrolyte and is also used as the positive electrode active material. As is apparent from the fact that the thionyl chloride is used as the positive electrode active material, the positive electrode 2 is not reacted but it is disposed for providing the place for the reaction between the thionyl chloride as the positive electrode active material and the lithium ion which is ionized and solved from the negative electrode 1 into the electrolyte 4.

The battery vessel 5 is formed into a flat disc vessel of stainless steel plate of 0.5 mm thick, with an outer diameter of 33 mm and total height of 6 mm, wherein in the central portion of the bottom wall 5a is formed a cylindrical electrolyte charging opening 12 whose surrounding wall has a top end portion 12a projected inwardly having an inner diameter of 2.1 mm and height of generally 1.5 mm. The cylindrical electrolyte charging opening 12 means that, when the electrolyte 4 is charged into the battery vessel, the entrance aperture through which the electrolyte is charged is formed to be cylindrical in shape.

The battery lid 6 comprises the lid body member 7 made of stainless steel, the ring shaped insulating layer 8 made of glass and the positive electrode terminal 9 made of stainless steel, wherein the outer surface of the insulating layer 8 is welded to the inner surface of the lid body 7 and the inner surface of the insulating layer 8 is welded to the outer surface of the positive, electrode terminal 9 so as to hold the hermetic sealed structure formed of metal-glass-metal, and moreover, the outer periphery of the lid body member 7 is welded to the upper end portion of the circumference wall of the upper opening of the battery vessel 5 as mentioned above, thereby obtaining the perfect sealing structure of the battery.

In this example, the first sealing member 13 has a spherical body of 2.3 mm diameter made of polytetrafluoroethylene and the diameter of the first sealing member 13 is made a little larger than the inner diameter of the electrolyte charging opening 12 so that the first sealing member 13 is inserted in the electrolyte charging opening 12 by press fitting against the surrounding wall of the opening 12 after the electrolyte is charged into the battery vessel. Therefore, the reactive stress of the surrounding wall member of the electrolyte charging opening 12 is applied to the contacted portion of the first sealing member 13 so that the contact ability is enhanced between the first sealing member 13 and the surrounding wall of the electrolyte charging opening 12, whereby the electrolyte charging opening 12 is sealed by the first sealing member 13 at least during the period until the second sealing member 14 is welded to the bottom wall 5a so as to seal the battery vessel. The second sealing member 14 is made of a stainless steel plate of a disc shape, 0.3 mm thick and 5 mm in diameter, whose central portion covers the entrance aperture at the side of the bottom end 12b of the electrolyte charging opening 12 and the peripheral portion of the second sealing member 14 is welded to the bottom wall 5a of the battery vessel 5. That is to say, the electrolyte charging opening 12 is temporarily sealed by the press fitting insertion of the first sealing member 13 therein and is perfectly sealed by welding the outer peripheral portion of the second sealing member 14 to the bottom wall 5a of the battery vessel 5.

The flat disc type sealed battery as mentioned above is produced in a manner as follows.

First, the electrolyte charging opening 12 is formed in the central portion of the bottom wall 5a of the battery vessel 5, as described above. Subsequently, the charge collecting member 10 on the positive electrode 2 is spot-welded to the lower surface of the positive electrode terminal 9 of the lid member 6 and the insulating member 11 is installed between the lid body 7 and the charge collecting member 10.

Next, the ring shaped lithium sheet is pressed so as to be bonded onto the inner surface of the bottom wall 5a of the battery vessel 5 to form the negative electrode 1 on which the separator member 3 is disposed. Subsequently, the positive electrode 2 is installed on the separator member 3 and the battery lid member 6 is fitted in the peripheral edge wall of the upper opening of the battery vessel 5 so that the outer peripheral portion of the lid body 7 of the battery lid 6 is welded to the peripheral edge wall of the upper opening of the battery vessel 5 by using a carbonic acid gas laser. At the time of sealing by welding as mentioned above, the output power of the carbonic acid gas laser is 700 W and the welding speed is 60 mm/sec.

Subsequently, the battery following assembly is reversed upside down to the state shown in FIG. 2 and, after the electrolyte is charged into the battery vessel 5 through the electrolyte charging opening 12 by a vacuum charging method, the first sealing member 13 is inserted by press fitting into the electrolyte charging opening 12 and the entrance aperture surrounded by the base edge portion 12b of the electrolyte charging opening 12 is covered by the second sealing member 14 and after the second sealing member 14 is spot-welded to be fixed to the bottom wall 5a of the battery vessel 5, the outer peripheral portion of the second sealing member 14 is welded to the bottom wall 5a of the battery vessel 5 by the carbonic acid gas laser so as to seal the opening 12 perfectly, thereby obtaining a desired battery with a sealed structure. At this time, the welding is performed under the condition that the output power of the laser is 400 W and the welding speed is 20 mm/sec.

EXAMPLE 2

Figure 4A:
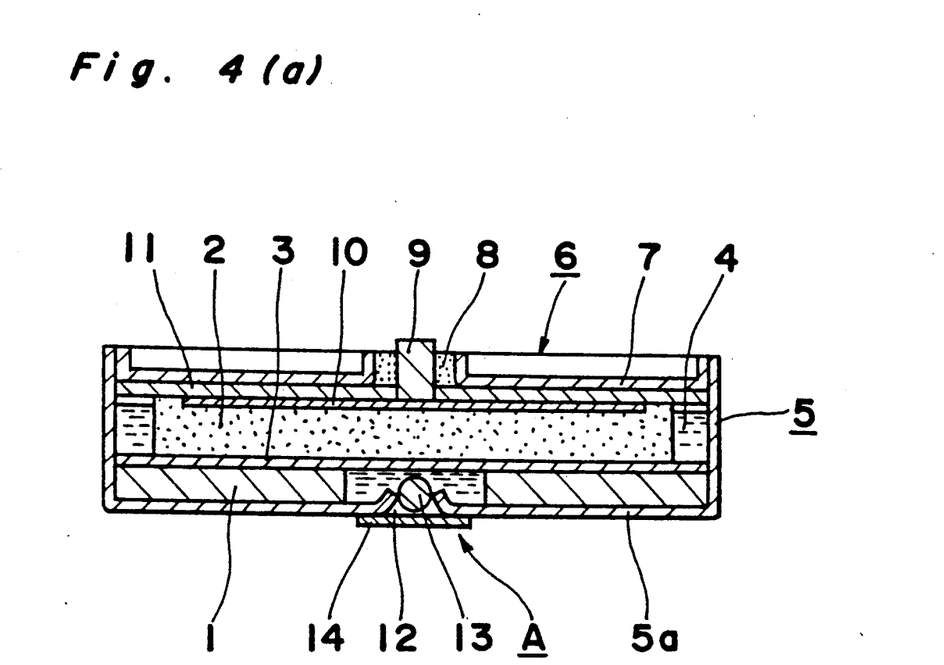
FIG. 4(a) is a sectional view showing a second embodiment of a flat type sealed battery according to the present invention.
Figure 4B:
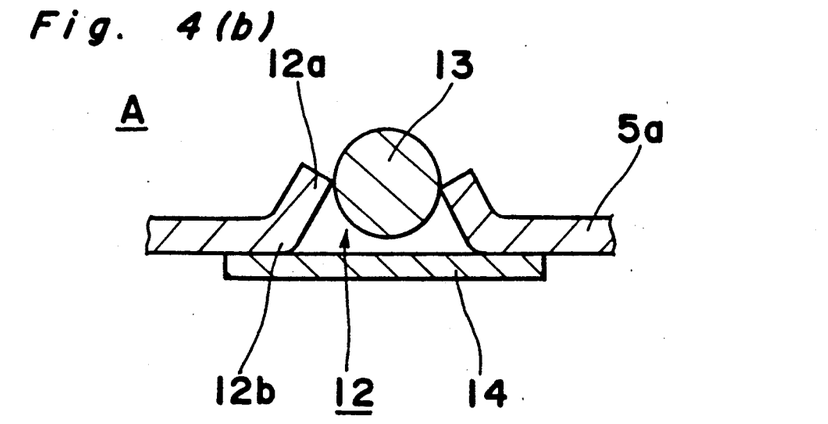
FIG. 4(b) is an enlarged sectional view showing an essential part A of the battery shown in FIG. 4(a)

FIG. 4 shows a second embodiment of a flat disc type sealed battery according to the present invention.

In this example, the difference from the first example is in the shape of the electrolyte charging opening 12 which is formed to have a taper cylindrical shape and the other structures are generally similar to those in the example 1.

Therefore, the explanation is made only about the electrolyte charging opening 12 and the reference portions associated therewith.

The battery vessel 5 is made of stainless steel plate of 0.5 mm thick, having an outer diameter of 33 mm and total height of 6 mm. The electrolyte charging opening 12 is of a taper cylindrical shape formed in the central portion of the bottom wall 5a of the battery vessel 5 having the top edge portion 12a of the opening 12 projected toward the inside of the battery as shown in FIG. 4(b). The taper cylindrical shape of the electrolyte charging opening 12 means that the space of the aperture for charging the electrolyte into the battery vessel is formed to be a taper cylindrical shape.

In the electrolyte charging opening 12, the maximum inner diameter surrounded by the base edge portion 12b of the bottom wall 5a is made 3 mm, and the minimum inner diameter surrounded by the top end portion 12a of the bottom wall 5a is made 2.1 mm. After the electrolyte is charged into the battery vessel by a vacuum charging method through the electrolyte charging opening 12, the first spherical sealing member 13 of 2.3 mm diameter, which is made of polytetrafluoroethylene, is inserted in the electrolyte charging opening 12 by press fitting to the end portion 12a of the surrounding wall thereof.

Because of the press fitting insertion of the first sealing member 13 of a spherical shape with a diameter slightly larger than the minimum inner diameter of the electrolyte charging opening 12, the reactive stress of the surrounding wall of the bottom wall 5a of the electrolyte charging opening 12 is applied to the first sealing member 13 due to the press fitting insertion of the sealing member 13 so that the fitting ability is enhanced between the first sealing member 13 and the surrounding wall of the electrolyte charging opening 12. Therefore, since the electrolyte charging opening 12 is sealed by the first sealing member 13 at least during the period until the second sealing member 14 is completely welded to the bottom wall 5a of the battery vessel 5, at the time of welding the second sealing member 14, it is possible to avoid evaporated gas of the electrolyte from being released to the welded portion and thus prevent the occurrence of pinholes in the welded portion.

The second sealing member 14 of a disc shape is made of stainless steel plate of 0.3 mm thick and 5 mm diameter, and the central portion thereof covers the entrance aperture of the electrolyte charging opening 12 under the condition that the outer peripheral portion thereof is welded to the bottom wall 5a of the battery vessel 5 by a carbonic acid gas laser. The condition of the welding of the second sealing member 14 is similar to that in the first example.

EXAMPLE 3

Figure 5A:
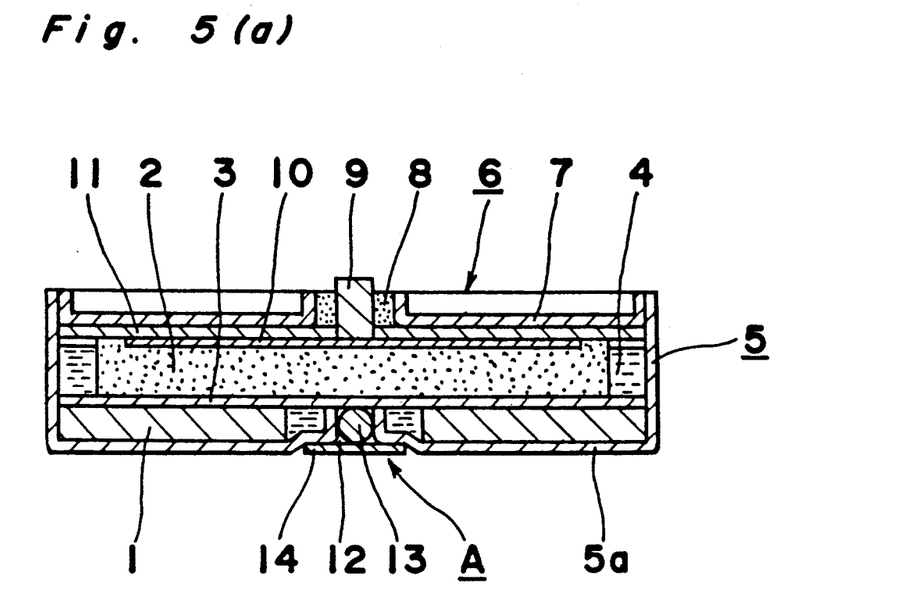
FIG. 5(a) is a sectional view showing a third embodiment of a flat type sealed battery according to the present invention.
Figure 5B:
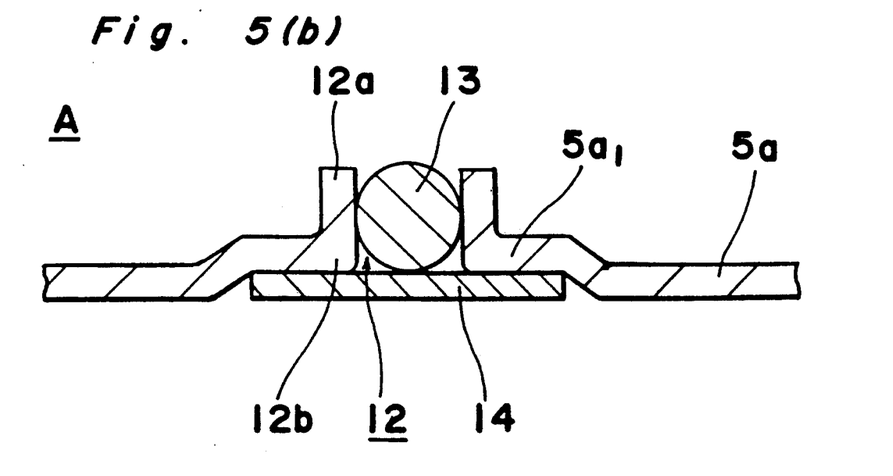
FIG. 5(b) is an enlarged sectional view showing an essential part A of the battery shown in FIG. 5(a)

FIG. 5 shows a third embodiment of a flat disc type sealed battery according to the present invention.

In the example 3, the central portion of the bottom wall 5a of the battery vessel 5 is projected toward the inside of the battery so as to form a convex portion $5a_1$ (i.e., as seen from the outer surface of the bottom wall of the battery, the central portion thereof is recessed inwardly so as to form a concave portion $5a_1$) and the electrolyte charging opening 12 of a cylindrical shape is formed in the central portion of the convex portion $5a_1$. After the electrolyte is charged into the battery vessel, the first sealing member 13 of generally a spherical shape is inserted in the cylindrical electrolyte charging opening 12 by press fitting, as described in example 1. The second sealing member 14 is attached in the concave portion $5a_1$ from the outside of the bottom wall 5a so that the level of the bottom surface of the second sealing member 14 is made generally equal to that of the bottom surface of the main bottom wall 5a, whereby the increment of the total height of the battery due to providing the second sealing member 14 can be reduced. Other structures of example 3 are similar to those in the example 1.

EXAMPLE 4

Figure 6A:
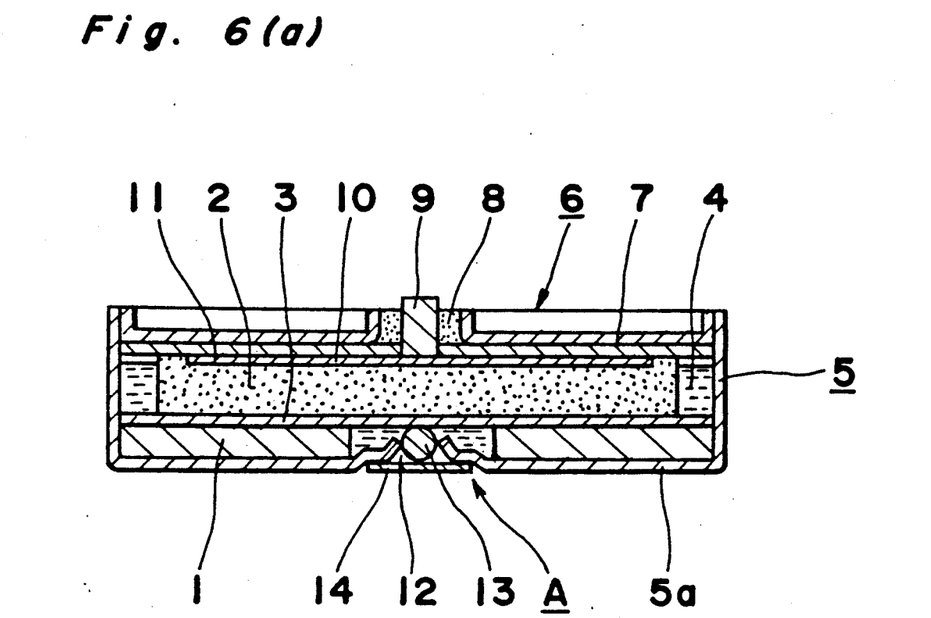
FIG. 6(a) is a sectional view showing a fourth embodiment of a flat type sealed battery according to the present invention.
Figure 6B:
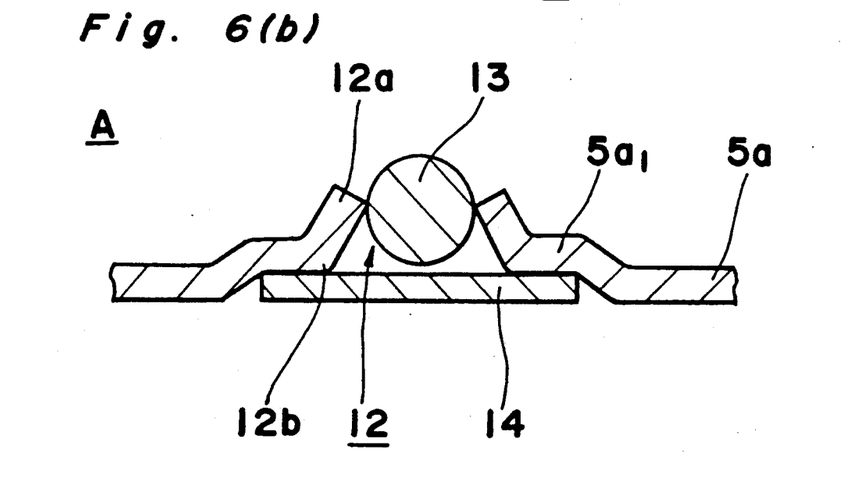
FIG. 6(b) is an enlarged sectional view showing an essential part A of the battery shown in FIG. 6(a), FIGS. 7 and 8 are sectional views showing the other examples of the first sealing member for use in the flat type sealed battery according to the present invention.

FIG. 6 shows a fourth embodiment of a flat disc type sealed battery according to the present invention, which is a combination of the examples 2 and 3.

In example 4, the central portion of the bottom wall 5a of the battery vessel 5 is projected toward the inside of the battery so as to form a convex portion $5a_1$ (i.e., seeing from the outer surface of the bottom wall of the battery, the central portion thereof is recessed inwardly so as to form a concave portion $5a_1$) and the electrolyte charging opening 12 of a taper cylindrical shape is formed in the central portion of the convex portion $5a_1$. After the electrolyte is charged into the battery vessel, the first sealing member 13 is inserted in the taper cylindrical electrolyte charging opening 12 by press fitting as described in example 2. The second sealing member 14 is fitted in the concave portion $5a_1$ from the outside of the bottom wall 5a so that the level of the bottom surface of the second sealing member 14 is made generally equal to that of the bottom surface of the main bottom wall 5a, so that the increment of the total height of the battery due to providing the second sealing member 14 can be reduced. Other structures of the fourth example are similar to those of example 3.

EXAMPLES 5 to 8

In the examples 5 to 8, a spherical member made of stainless steel is used as the first sealing member 13. In the fifth example, as the first sealing member 13, there is used a spherical member made of stainless steel with a diameter of 2.3 mm and the other structures are similar to those in the example 1.

In the example 6, as the first sealing member 13, there is used a spherical member made of stainless steel with a diameter of 2.3 mm and the other structures are similar to those in the example 2.

In the example 7, as the first sealing member 13, there is used a spherical member made of stainless steel with a diameter of 2.3 mm and the other structures are similar to those in the example 3.

In the example 8, as the first sealing member 13, there is used a spherical member made of stainless steel with a diameter of 2.3 mm and the other structures are similar to those in the example 4.

In these examples 5 to 8, the outer peripheral portion of the second sealing member 14 is welded to the bottom wall 5a of the battery vessel 5 by the carbonic acid gas laser under the same condition as that in the example 1, that is, the output power of the laser is 400 W and the welding speed is 20 mm/sec.

EXAMPLE 9

Figure 9:
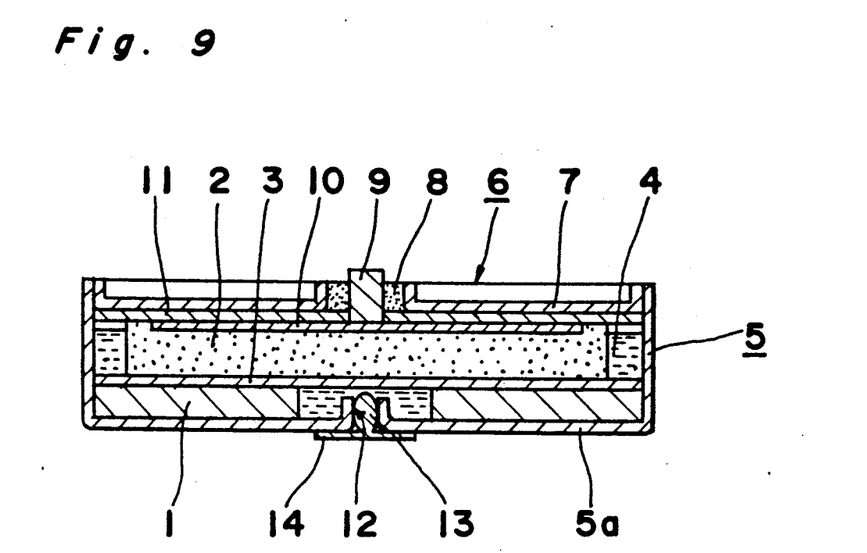
FIG. 9 is a sectional view showing a ninth embodiment of a flat type sealed battery according to the present invention.

FIGS. 9 and 10 show a ninth embodiment of a flat disc type sealed battery according to the present invention, wherein the first sealing member 13 and the second sealing member 14 are connected as one sealing member, which is similar to those in the examples 10 to 13. And since other main structures thereof and the method for producing the battery are similar to those in the examples 1 to 8, the explanation thereof is omitted.

Figure 7:
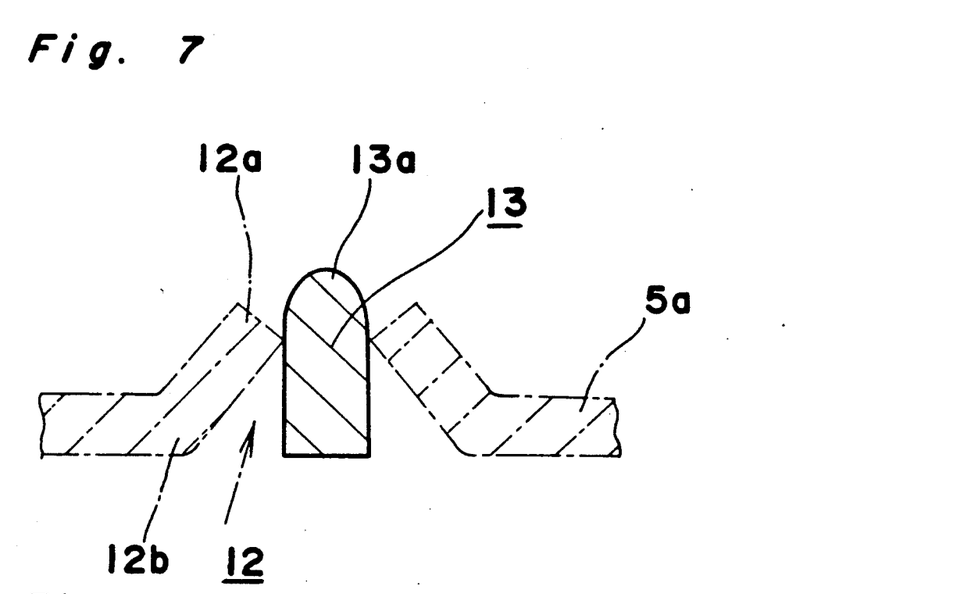
Figure 8:
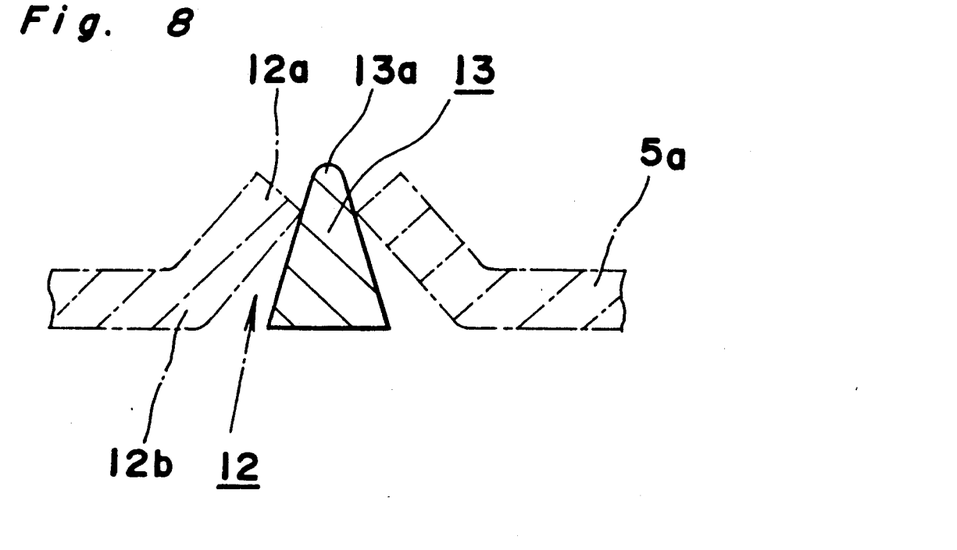

The first sealing member 13 with an oval shape comprises a top portion 13a of a spherical shape having the diameter gradually increasing to the maximum at the middle portion thereof and decreasing to the lower portion thereof and the maximum diameter is made 2.3 mm, which is slightly larger than the inner diameter of the electrolyte charging opening 12, so that the first sealing member 13 is inserted in the electrolyte charging opening 12 by press fitting as described above so as to seal the electrolyte charging opening 12. However, the shape of the first sealing member 13 is not limited to the oval form and the other types may be used, as shown in FIGS. 7 and 8.

Figure 10A:
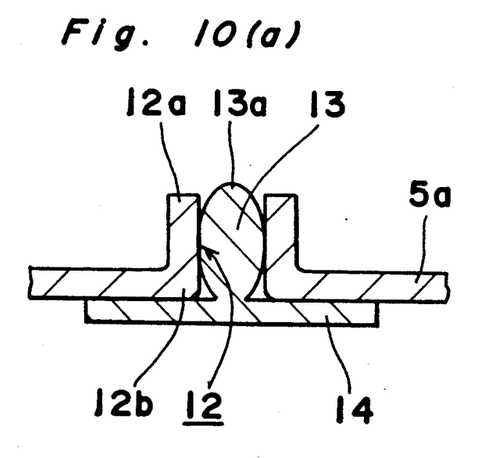
FIG. 10(a) is an enlarged sectional view showing an essential part of the battery shown in FIG. 9.
Figure 10B:
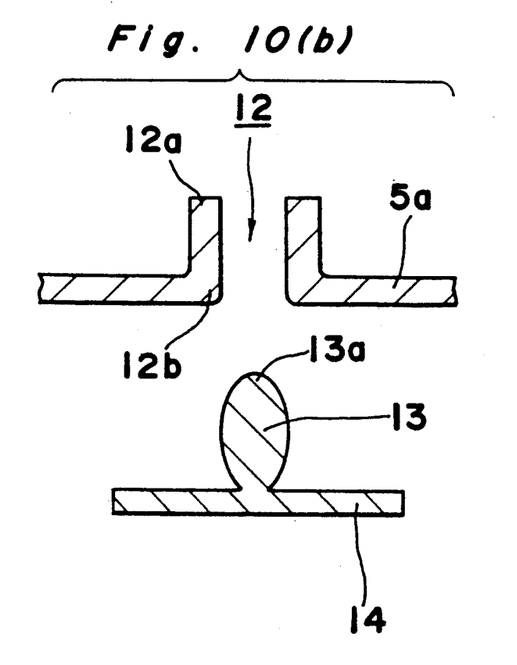
FIG. 10(b) is an exploded view of FIG. 10(a)

The second sealing member 14 which is the base plate connected to the first sealing member 13 as one body has a diameter of 5 mm and a thickness of 0.3 mm, so that the sealing plate 14 covers the entrance of the opening 12 at the side of the base edge portion 12b and the outer peripheral portion of the sealing plate 14 is welded to the bottom wall 5a, as described above.

EXAMPLE 10

Figure 11A:
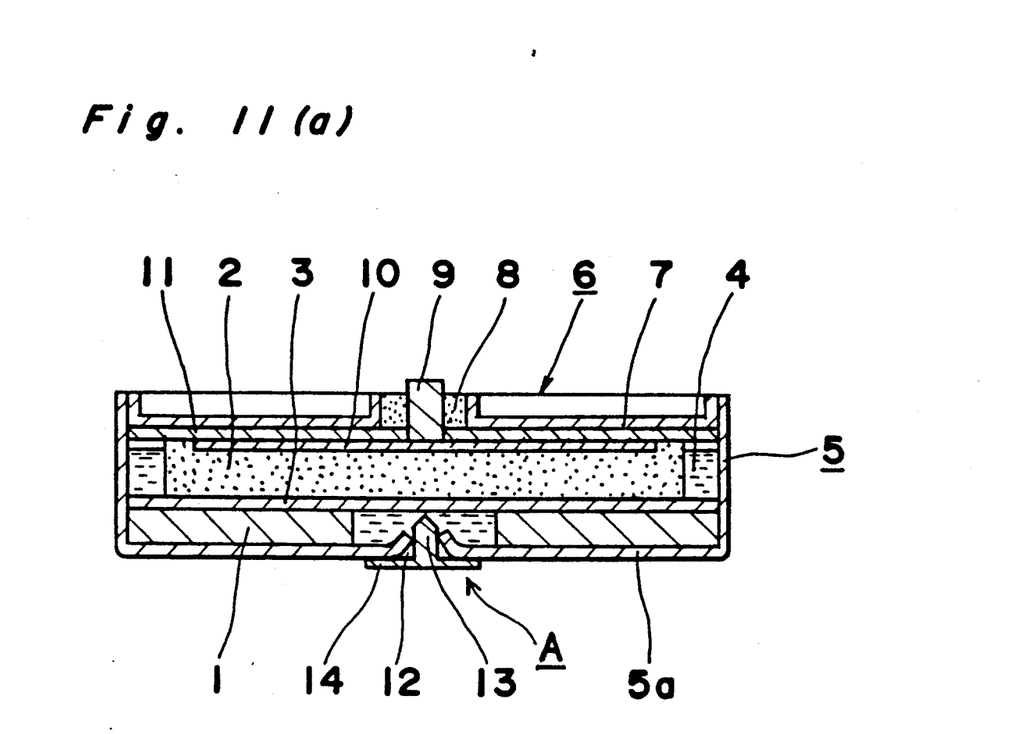
FIG. 11(a) is a sectional view showing a tenth embodiment of a flat type sealed battery according to the present invention.
Figure 11B:
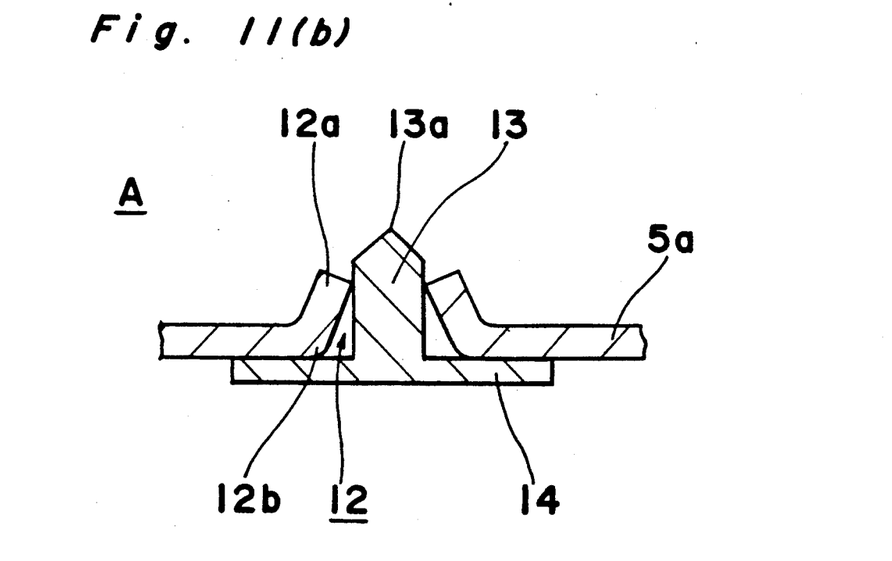
FIG. 11(b) is an enlarged sectional view showing an essential part A of the battery shown in FIG. 11(a)

FIG. 11 shows a tenth embodiment of a flat disc type sealed battery according to the present invention.

In this example, the difference from example 9 is in that the electrolyte charging opening 12 is formed to be taper cylindrical shape and the first sealing member 13 is made column shaped with its top portion 13a formed to be coniform and the other structures are generally similar to those in the ninth example, as shown in FIG. 9.

Therefore, the explanation is made only about the electrolyte charging opening 12 and the reference portions associated therewith.

The battery vessel 5 is made of stainless steel plate of 0.5 mm thick, having an outer diameter of 33 mm and total height of 6 mm. The electrolyte charging opening 12 of a taper cylindrical shape is formed in the central portion of the bottom wall 5a of the battery vessel 5 having its top edge portion 12a of the opening 12 projected toward the inside of the battery as shown in FIG. 11(b). The taper cylindrical shape of the electrolyte charging opening 12 means that the space of the aperture for charging the electrolyte into the battery vessel is formed to be a taper cylindrical shape.

In the electrolyte charging opening 12, the maximum inner diameter of the entrance aperture surrounded by the base edge portion 12b of the bottom wall 5a is made 3 mm, and the minimum inner diameter surrounded by the top end portion 12a of the bottom wall 5a is made 2.1 mm. After the electrolyte is charged into the battery vessel by a vacuum charging method through the electrolyte charging opening 12, the taper column sealing member 13 with a maximum diameter of 2.3 mm is inserted in the electrolyte charging opening 12 by press fitting to the end portion 12a of the surrounding wall thereof.

Because of the press fitting insertion of the taper column sealing member 13 having a diameter slightly larger than the minimum inner diameter of the electrolyte charging opening 12, the reactive stress of the surrounding wall of the bottom wall 5a of the electrolyte charging opening 12 is applied to the taper column sealing member 13 due to the press fitting insertion of the sealing member 13 so that the fitting ability between the taper column sealing member 13 and the surrounding wall of the electrolyte charging opening 12 is enhanced. Therefore, since the electrolyte charging opening 12 is sealed by the taper column sealing member 13 at least during the period until the base sealing plate 14 is completely welded to the bottom wall 5a of the battery vessel 5, it is possible to avoid the gas of the evaporated electrolyte from releasing out to the welded portion so as to prevent the occurrence of pinholes in the welded portion.

The base sealing plate 14 of disc shape is made of stainless steel plate of 0.3 mm thick and 5 mm diameter, and the center portion thereof covers the entrance aperture of the electrolyte charging opening 12 under the condition that the outer peripheral portion thereof is welded to the bottom wall 5a of the battery vessel 5 by the carbonic acid gas laser. The condition of the welding of the base sealing plate 14 is similar to that in the ninth example, i.e., the output power of the laser is 400 W and the welding speed is 20 mm/sec.

EXAMPLE 11

Figure 12A:
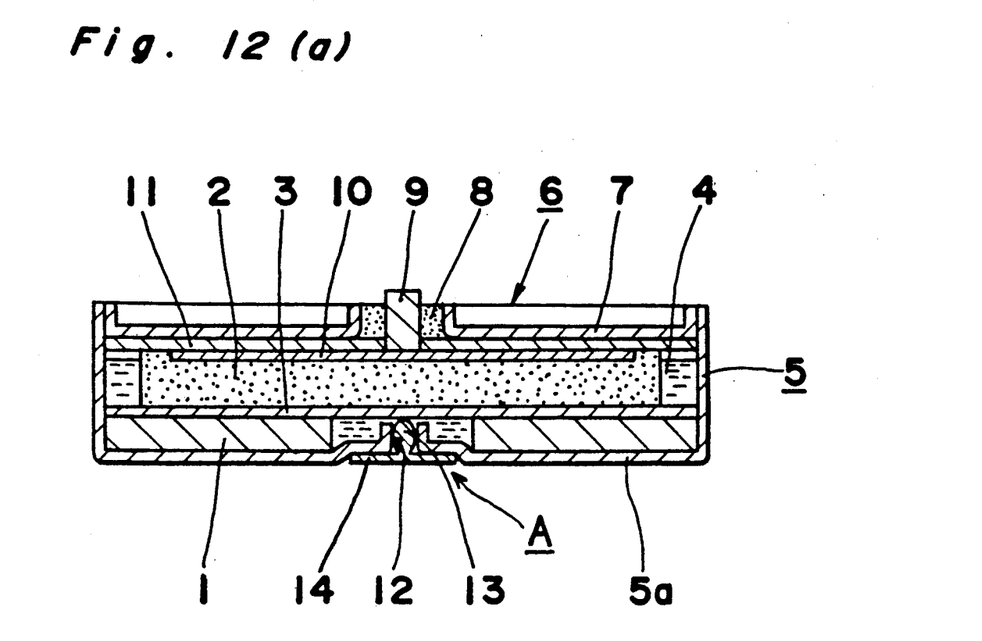
FIG. 12(a) is a sectional view showing a eleventh embodiment of a flat type sealed battery according to the present invention.
Figure 12B:
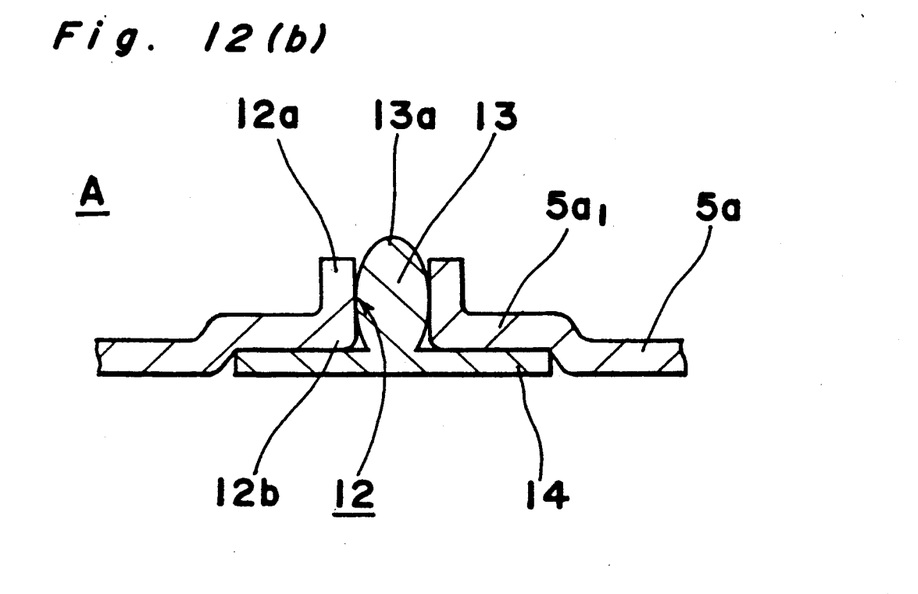
FIG. 12(b) is an enlarged sectional view showing an essential part A of the battery shown in FIG. 12(a)

FIG. 12 shows an eleventh embodiment of a flat disc type sealed battery according to the present invention, which is a combination of examples 3 and 9. And since the remaining main structures thereof and the method for producing the battery are similar to those in the examples 3 and 9, the explanation thereof is omitted.

EXAMPLE 12

Figure 13A:
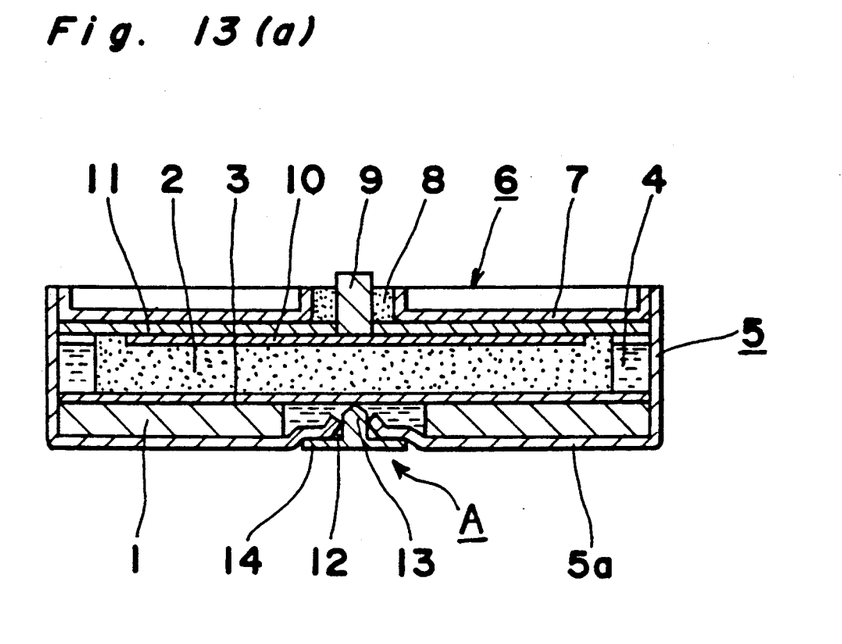
FIG. 13(a) is a sectional view showing a twelfth embodiment of a flat type sealed battery according to the present invention.
Figure 13B:
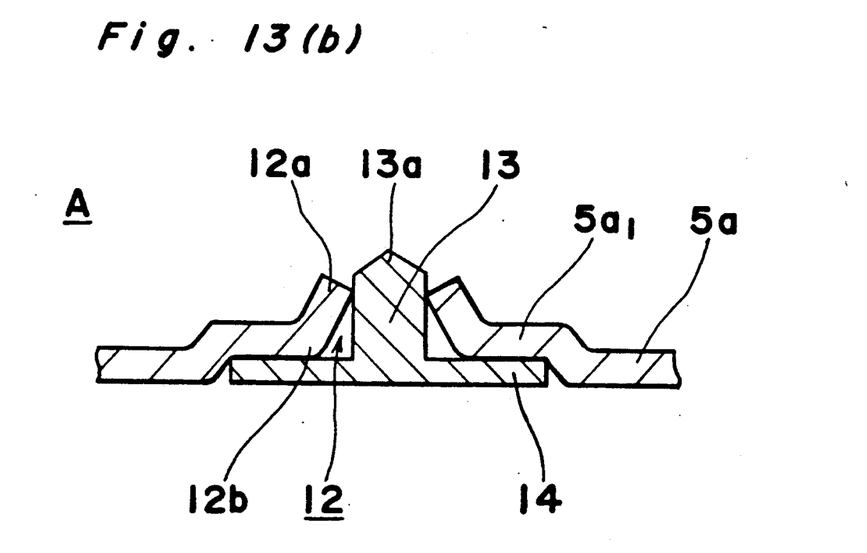
FIG. 13(b) is an enlarged sectional view showing an essential part A of the battery shown in FIG. 13(a)

FIG. 13 shows a twelfth embodiment of a flat disc type sealed battery according to the present invention, which is a combination of examples 4 and 10. And since other main structures thereof and the method for producing the battery are similar to those in examples 4 and 10, the explanation thereof is omitted.

EXAMPLE 13

Figure 14A:
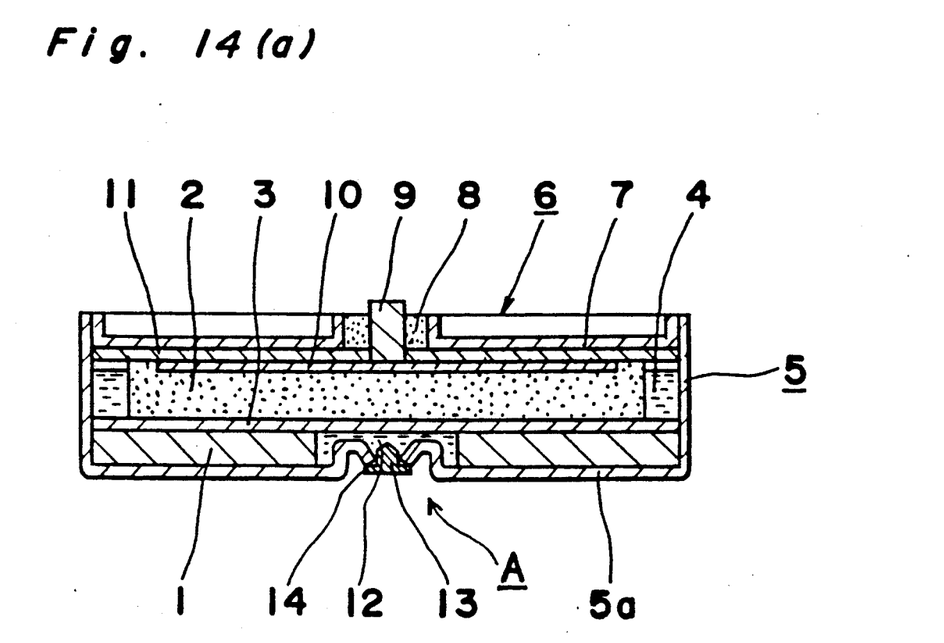
FIG. 14(a) is a sectional view showing a thirteenth embodiment of a flat type sealed battery according to the present invention.
Figure 14B:
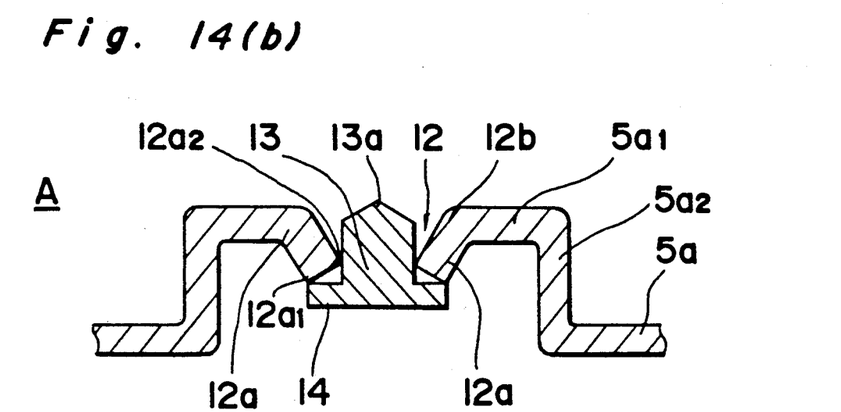
FIG. 14(b) is an enlarged sectional view showing an essential part A of the battery shown in FIG. 14(a)

FIG. 14 shows a thirteenth embodiment of a flat disc type sealed battery according to the present invention.

In this example, the difference point from example 12 is in that the electrolyte charging opening 12 of a taper cylindrical shape is formed in the central portion of the bottom wall 5a of the battery vessel 5 having a portion $5a_2$ bent vertically to form a small cylindrical shape and its edge portion 12a of the opening 12 projected downwardly (toward the outside of the battery), as shown in FIG. 14(b). In this modification, the corner edge $12a_1$ of the edge portion 12a is welded to the upper surface of the second sealing plate 14 with the other corner $12a_2$ pressed to the cylindrical surface of the first sealing member 13. And since other main structures thereof and the method for producing the battery are similar to those in the example 12, the explanation thereof is omitted.

COMPARISON

Next, table 1 shows the results of occurrence of the inferior welding in the batteries due to the occurrence of pinholes when the second sealing member 14 is welded by the carbonic acid gas laser, comparing the examples of the battery according to the present invention with the comparative example of the conventional battery shown in FIG. 1.

TABLE 1

| BATTERY | NUMBER OF BATTERIES HAVING INFERIOR WELDING CAUSED |
|---|---|
| EXAMPLE 1 | 0/20 |
| EXAMPLE 2 | 0/20 |
| EXAMPLE 3 | 0/20 |
| EXAMPLE 4 | 0/20 |
| EXAMPLE 5 | 0/20 |
| EXAMPLE 6 | 0/20 |
| EXAMPLE 7 | 0/20 |
| EXAMPLE 8 | 0/20 |
| EXAMPLE 9 | 0/20 |
| EXAMPLE 10 | 0/20 |
| EXAMPLE 11 | 0/20 |
| EXAMPLE 12 | 0/20 |
| EXAMPLE 13 | 0/20 |
| COMPARATIVE 1 | 20/20 |

In table 1, the denominators of the numerals in the column represent the number of all of the batteries submitted to the test of the welding and the numerators thereof represent the number of batteries having the occurrence of inferior welding.

As shown in table 1, in the batteries of the comparative example 1, there occur inferior welding in all of the batteries but in the batteries of the examples of the present invention, there is no occurrence of an inferior welding.

Moreover, in the examples 1 to 13, all, of the batteries have sufficient sealing function representing $10^{-9}$ atom cc/sec of helium gas in the leak examination.

Although, in the examples 1 to 8, as the first sealing member 13 there is used a spherical member, it is not limited to this and there may be used such as a column sealing plug member with its top portion 13a of a spherical shape, as shown in FIG. 7, or there may be used a coniform member with its top portion 13a rounded, as shown in FIG. 8. In other words, as the first sealing member 13, there may be used a member having a top portion with a diameter smaller than the minimum inner diameter of the electrolyte charging opening 12 and having a portion whose diameter is slightly larger than the minimum inner diameter of the electrolyte charging opening 12.

Moreover, in examples 1 to 8, although the first sealing member 13 is made of polytetrafluoroethylene material, it is not limited to this and there may be used a member which is made of ethylene-tetrafluoroethylene, common polymeric material of fluorine-contained polymers and, metallic material such as stainless steel or nickel.

Moreover, in examples 9 to 12, although there is used a sealing member with a head portion 13 of an oval shape, as shown in FIGS. 9 and 12, or with a head portion 13 of a column shape with a coniform top portion 13a, as shown in FIGS. 11, 13 and 14, it is not limited to these shapes and other types may be used so long as the diameter of the top portion 13a of the sealing member 13 is slightly smaller than the minimum inner diameter of the electrolyte charging opening 12 and the maximum diameter of the sealing member 13 is slightly larger than the minimum inner diameter of the electrolyte charging opening 12.

Moreover, in examples 5 to 8, although there is used a sealing member made of stainless steel, the material of the sealing member is not limited to this and other material, such as nickel, may be used.

Moreover, in the embodiments of the present invention, although the insulating layer 8 is made of glass, it is not limited to this and the insulating layer 8 may be made of other material, such as ceramics. Although, in the embodiments mentioned above, the explanation is made about a flat type sealed battery of a lithium thionyl chloride group using lithium as the negative electrode active material and thionyl chloride as the positive electrode active material and as the solvent of the electrolyte, the present invention is not limited to this, and the negative electrode active material may be made of other alkaline metal, such as sodium or potassium, and also the positive electrode active material may be made of oxyhalogenide (oxyhalide), such as sulfuryl chloride, or phosphoryl chloride which is liquid at a normal temperature (25° C.), and not only the oxyhalide mentioned above but also organic electrolyte may be used as the solvent of the electrolyte.

MODIFIED EXAMPLE

Figure 15:
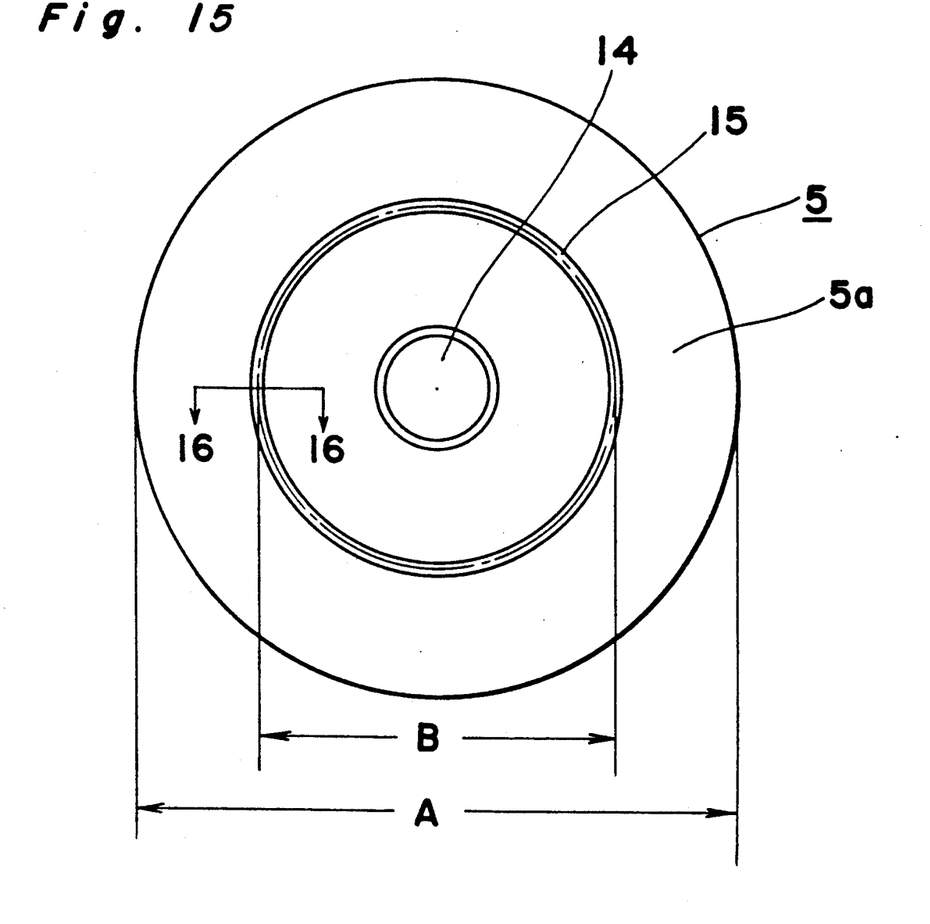
FIG. 15 is a schematic bottom plan view of the battery vessel.
Figure 16:
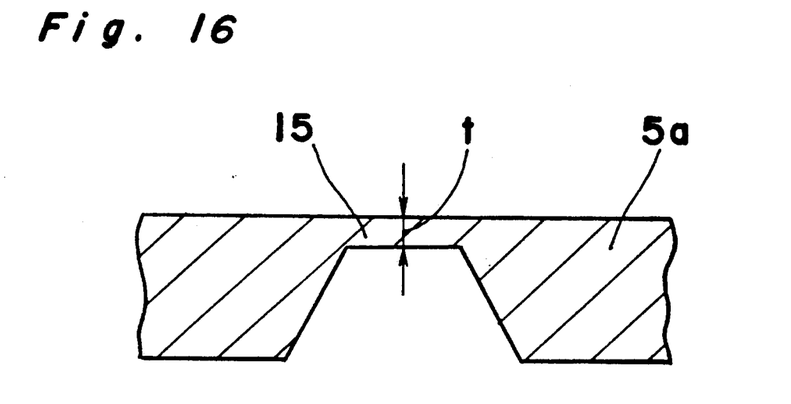
FIG. 16 is a sectional view cutting along the line A—A shown in FIG. 15.

In the flat disc type sealed battery according to the present invention, there is provided an explosion preventing mechanism mentioned later in the bottom wall 5a of the battery vessel 5. That is to say, when the flat type sealed battery is put in such an abnormal condition that the battery is exposed in a high temperature heating condition or the battery is charged with high voltage, the internal pressure of the battery is abnormally raised and the battery will rupture under the high pressure, resulting in occurrence of a so called battery explosion and the contents of the battery are scattered in all directions so as to contaminate and damage the apparatus using the battery. Therefore, in order to prevent the battery explosion, there is formed an annular thin groove 15 in the bottom wall 5a of the battery vessel 5, as shown in FIG. 15. The diameter of the annular thinned groove 15 is made to be 19 to 87% of the outer diameter of the bottom wall 5a of the battery vessel 5, whereby the explosion of the battery can be perfectly prevented. Besides this, as shown in FIG. 16, when the annular thin groove 15 is provided with its thickness (t) of 0.05 to 0.20 mm, the similar effect can be obtained. Moreover, upon combining the above two kinds of explosion preventing mechanisms according to the object of the usage of the battery, the effects of both mechanisms are synergistically enhanced so as to obtain a more perfect explosion preventing mechanism.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A flat disc type sealed battery comprising
   a batter vessel having a bottom wall with a taper cylindrically shaped electrolyte charging opening formed in the central portion thereof including an aperture in a side of a lower edge portion of said electrolyte charging opening,
   a battery lid member for covering an upper opening of said batter vessel,
   power generating components of said batter which are enclosed by sealing said batter vessel and battery lid member, a first sealing member having a tapered shaped for sealing said electrolyte charging opening after electrolyte is charged into said battery vessel, and a second sealing member for covering said aperture in the side of said lower edge portion of said electrolyte charging opening, an outer peripheral portion of said second sealing member being welded to said bottom wall of said battery vessel, said first and second sealing members being connected as one body, said first sealing member having an outer diameter greater than an inner diameter of said electrolyte charging opening.

2. The flat disc type sealed battery according to claim 1, wherein said first sealing member is spherically shaped and said second sealing member is a metallic plate.

* * * * *